(12) United States Patent
Liu

(10) Patent No.: US 11,317,097 B2
(45) Date of Patent: Apr. 26, 2022

(54) VIDEO ENCODING METHOD AND APPARATUS, COMPUTER-READABLE STORAGE MEDIUM, AND COMPUTER DEVICE

(71) Applicant: TENCENT TECHNOLOGY (SHENZHEN) COMPANY LIMITED, Guangdong (CN)

(72) Inventor: Zhaorui Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/078,414

(22) Filed: Oct. 23, 2020

(65) Prior Publication Data

US 2021/0044805 A1    Feb. 11, 2021

Related U.S. Application Data

(63) Continuation of application No. PCT/CN2019/109976, filed on Oct. 8, 2019.

(30) Foreign Application Priority Data

Oct. 31, 2018 (CN) .......................... 201811288530.5

(51) Int. Cl.
*H04N 19/146* (2014.01)
*H04N 19/14* (2014.01)
(Continued)

(52) U.S. Cl.
CPC ........... *H04N 19/146* (2014.11); *H04N 19/14* (2014.11); *H04N 19/172* (2014.11); *H04N 19/189* (2014.11)

(58) Field of Classification Search
CPC .. H04N 19/146; H04N 19/172; H04N 19/189; H04N 19/14
See application file for complete search history.

(56) References Cited

U.S. PATENT DOCUMENTS 6,510,176 B1 * 1/2003 Fukuda ................... H04N 19/15
375/240.02
2008/0151998 A1 6/2008 He
(Continued)

FOREIGN PATENT DOCUMENTS

CN 102036062 A 4/2011
CN 103096048 A 5/2013
(Continued)

OTHER PUBLICATIONS

International Search Report for PCT/CN2019/109976 dated Dec. 31, 2019 [PCT/ISA/210].
(Continued)

*Primary Examiner* — Kyle M Lotfi
(74) *Attorney, Agent, or Firm* — Sughrue Mion, PLLC

(57) ABSTRACT

The disclosure relates to a video encoding method and a video encoding apparatus, a computer-readable storage medium, and a computer device. The method includes: acquiring a current video frame and an initial quantization parameter; calculating first historical complexity corresponding to the current video frame at a first time granularity; acquiring a second available bit rate at a second time granularity corresponding to the current video frame and a current first available bit rate at the first time granularity corresponding to the current video frame; adjusting the second available bit rate and the first available bit rate according to complexity of the current video frame and the first historical complexity; updating the initial quantization parameter according to an adjusted second available bit rate (Continued)

to obtain a current quantization parameter; and encoding the current video frame according to the current quantization parameter.

20 Claims, 6 Drawing Sheets

(51) Int. Cl.
  *H04N 19/172* (2014.01)
  *H04N 19/189* (2014.01)

(56) References Cited

U.S. PATENT DOCUMENTS

| | | | | |
|---|---|---|---|---|
| 2009/0310673 | A1* | 12/2009 | Chung | H04N 19/115 375/240.03 |
| 2011/0051806 | A1 | 3/2011 | Lee | |
| 2015/0256850 | A1* | 9/2015 | Kottke | H04N 19/139 375/240.16 |
| 2016/0150229 | A1 | 5/2016 | Jun et al. | |
| 2017/0347044 | A1* | 11/2017 | Douady-Pleven | G06T 7/00 |

FOREIGN PATENT DOCUMENTS

| | | |
|---|---|---|
| CN | 104410861 A | 3/2015 |
| CN | 104780369 A | 7/2015 |
| CN | 110213585 A | 9/2019 |
| JP | 4-137685 A | 12/1992 |
| JP | 10-164577 A | 6/1998 |
| WO | 2010/057213 A1 | 5/2010 |

OTHER PUBLICATIONS

Written Opinion for PCT/CN2019/109976 dated Dec. 31, 2019 [PCT/ISA/237].
Notice of Reasons for Refusal dated Dec. 24, 2021 from the Japanese Patent Office in JP Application No. 2020-560329.
Extended European Search Report dated Jan. 7, 2022 from the European Patent Office in EP Application No. 19880678.8.

* cited by examiner

VIDEO ENCODING METHOD AND APPARATUS, COMPUTER-READABLE STORAGE MEDIUM, AND COMPUTER DEVICE

CROSS-REFERENCE TO RELATED APPLICATION(S)

This application is a bypass continuation application of International Application No. PCT/CN2019/109976, filed on Oct. 8, 2019, which claims priority to Chinese Patent Application No. 201811288530.5, entitled "VIDEO ENCODING METHOD AND APPARATUS, COMPUTER-READABLE STORAGE MEDIUM, AND COMPUTER DEVICE" and filed with the China National Intellectual Property Administration on Oct. 31, 2018, the disclosures of which are herein incorporated by reference in their entireties.

FIELD

The disclosure relates to the field of computer technologies, and in particular, to a video encoding method and an video encoding apparatus, a non-transitory computer-readable storage medium, and a computer device.

BACKGROUND

H.264 video encoding standard is widely adopted in the field of Internet videos. In technical fields related to videos such as the field of live streaming, due to limited bandwidths and storage resources, a video source is generally transcoded to various video streams with different bit rates to help a user select a bit rate level that conforms to bandwidth and traffic requirements of the user to watch the video, thereby ensuring the fluency of the video watching process, and saving a bandwidth for each video distribution server as well.

During video encoding, how to stabilize a bit rate within a user-specified range while improving video quality as much as possible is key research content for a video encoder. Currently, in order to ensure a low delay and the stability of a bit rate, a mainstream encoder of H264, such as x264, can only control a bit rate in a fine time granularity range. The relative small range of bit rate control causes relative poor encoding quality.

SUMMARY

One or more example embodiments of the disclosure provide a video encoding method, a video encoding apparatus, a non-transitory computer-readable storage medium, and a computer device are provided, to resolve the technical problem of relative poor encoding quality because a bit rate may only be controlled in a second time granularity range in the encoding manner above. Embodiments of the disclosure also resolve other technical problems.

A video encoding method is provided, including:
acquiring a current video frame and an initial quantization parameter;
calculating first historical complexity corresponding to the current video frame at a first time granularity;
acquiring a second available bit rate at a second time granularity corresponding to the current video frame and a first available bit rate at the first time granularity corresponding to the current video frame, the second time granularity being a finer time unit relative to the first time granularity;
adjusting the second available bit rate and the first available bit rate according to complexity of the current video frame and the first historical complexity;
updating the initial quantization parameter according to the adjusted second available bit rate to obtain a current quantization parameter; and
encoding the current video frame according to the current quantization parameter.

A video encoding apparatus includes:
at least one memory configured to store program code; and
at least one processor configured to read the program code and operate as instructed by the program code, the program code comprising:
video frame acquisition code configured to cause at least one of the at least one processor to acquire a current video frame and an initial quantization parameter;
historical complexity calculation code configured to cause at least one of the at least one processor to calculate first historical complexity corresponding to the current video frame at a first time granularity;
available bit rate acquisition code configured to cause at least one of the at least one processor to acquire a second available bit rate at a second time granularity corresponding to the current video frame and a first available bit rate at the first time granularity corresponding to the current video frame, the second time granularity being a finer time unit relative to the first time granularity;
bit rate adjusting code configured to cause at least one of the at least one processor to adjust the second available bit rate and the first available bit rate according to complexity of the current video frame and the first historical complexity;
quantization parameter updating code configured to cause at least one of the at least one processor to update the initial quantization parameter according to an adjusted second available bit rate to obtain a current quantization parameter; and
encoding code configured to cause at least one of the at least one processor to encode the current video frame according to the current quantization parameter.

A non-transitory computer-readable storage medium is provided, storing a computer program, the computer program, when being executed by a processor, causing the processor to perform the operations of the foregoing video encoding method.

A computer device is provided, including a memory and a processor, the memory storing a computer program, the computer program, when executed by the processor, causing the processor to perform the following operations:
acquiring a current video frame and an initial quantization parameter;
calculating first historical complexity corresponding to the current video frame at a first time granularity;
acquiring a second available bit rate at a second time granularity corresponding to the current video frame and a first available bit rate at the first time granularity corresponding to the current video frame, the second time granularity being a finer time unit relative to the first time granularity;
adjusting second available bit rate and the first available bit rate according to complexity of the current video frame and the first historical complexity;
updating the initial quantization parameter according to an adjusted second available bit rate to obtain a current quantization parameter; and encoding the current video frame according to the current quantization parameter.

BRIEF DESCRIPTION OF THE DRAWINGS

To describe the technical solutions of the example embodiments of the disclosure or the related art more clearly, the following briefly introduces the accompanying drawings required for describing the example embodiments or the related art. Apparently, the accompanying drawings in the following description show only some embodiments of the disclosure, and a person of ordinary skill in the art may still derive other drawings from these accompanying drawings without creative efforts.

DETAILED DESCRIPTION

To make the objectives, technical solutions, and advantages of the disclosure clearer and more comprehensible, the following further describes the disclosure in detail with reference to the accompanying drawings and embodiments. It is to be understood that the specific embodiments described herein are merely used for explaining the disclosure, and are not intended to limit the disclosure.

Figure 1:
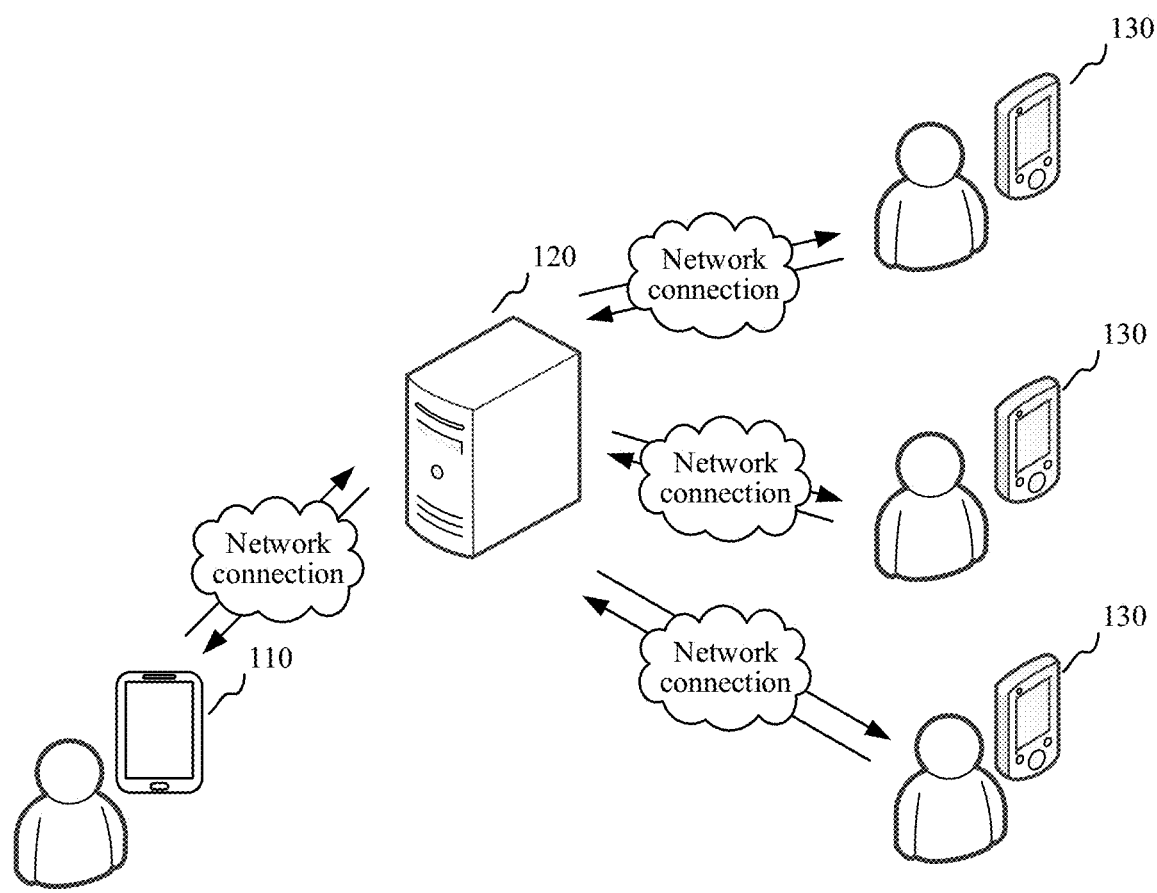
FIG. 1 is a diagram of an application environment of a video encoding method according to an embodiment.

FIG. 1 is a diagram of an application environment of a video encoding method according to an embodiment. Referring to FIG. 1, the video encoding method is applied to a video encoding system. The video encoding system includes an anchor terminal 110, a video distribution server 120, and a user terminal 130. The anchor terminal 110 is connected to the video distribution server 120 through a network. The video distribution server 120 is connected to the user terminal 130 through a network. The anchor terminal 110 or the user terminal 130 may be a desktop terminal or a mobile terminal, and the mobile terminal may be at least one of a mobile phone, a tablet computer, a notebook computer, and the like. The video distribution server 120 may be implemented by using an independent server or a server cluster including a plurality of servers. The video distribution server 120 may be alternatively a cloud server providing basic cloud computing services, such as a cloud server, a cloud database, cloud storage, and a content delivery network (CDN).

The video distribution server 120 may include a video encoder and a code stream controller. The video encoder is used for encoding a video stream pushed by the anchor terminal 110, inputting a code stream obtained after the video is encoded into a buffer to get buffered, and transmitting the code stream through Internet. The code stream controller may be used for adjusting a quantization parameter in the video encoder, so as to control the video encoder to perform subsequent video encoding, to prevent overflow in the buffer. The video distribution server 120 may further push the obtained code stream to the user terminal 130.

Figure 2:
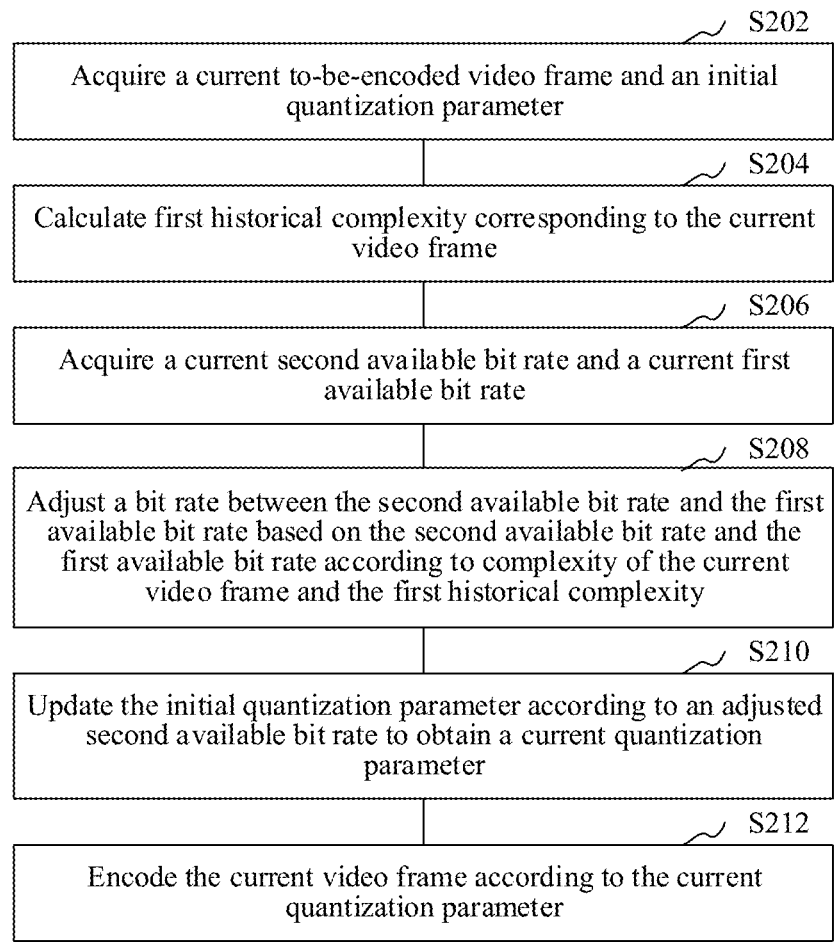
FIG. 2 is a schematic flowchart of a video encoding method according to an embodiment.

As shown in FIG. 2, in an embodiment, a video encoding method is provided. The video encoding method in this embodiment may be applied to a computer device. The computer device may be the video distribution server 120 in FIG. 1, but is not limited thereto. Referring to FIG. 2, the video encoding method specifically includes the following operations S202-S212.

S202. Acquire a current video frame to be encoded and an initial quantization parameter.

A video stream is formed by video frame sequences. The current video frame refers to a video frame that currently needs to be encoded. When the video stream is to be encoded, the video frame sequences are inputted in a video encoder, and the video encoder acquires the video frame to be encoded according to a preset order and performs encoding.

A quantization parameter is a sequence number of a quantization operation. A quantization parameter corresponds to a quantization operation. A quantization operation may be acquired according to a corresponding quantization parameter. The current video frame is quantized and encoded according to the quantization operation. The initial quantization parameter is a preset quantization parameter. The value of the initial quantization parameter may be set according to actual requirements such as a bandwidth of a current network and an average encoding bit rate. When the video frame sequence is encoded, the same initial quantization parameter may be set for each video frame in the video frame sequence.

S204. Calculate first historical complexity corresponding to the current video frame.

A time granularity is a unit with which time is refined. A second time granularity is a finer time unit relative to a first time granularity. A finer time unit indicates that the time unit represents a unit of a shorter time period. For example, a second is a finer time granularity relative to a minute, and a millisecond is a finer time granularity relative to a second. In an embodiment, the first time granularity means division of time in minutes, and the second time granularity means division of time in seconds. In another example, one minute is a finer time granularity relative to two minutes. The first time granularity means division of time using two minutes as a unit, and the second time granularity means division of time using one minute as a unit. These are merely examples and the embodiments of the disclosure do not limit the time unit for division, the first time granularity, and the second time granularity.

Historical complexity is historical complexity information corresponding to the current video frame, which may be obtained through calculation according to complexity corresponding to a plurality of video frames before the current video frame. The first historical complexity is historical complexity information, obtained at the first time granularity, corresponding to the current video frame, and may be used for predicting complexity of the current video frame at the first time granularity, so as to predict a required bit rate for video encoding of the current video frame after bit rate control is performed on the current video frame at the first time granularity. Higher first historical complexity indicates that overall complexity of video frames in a time range corresponding to the first granularity is relatively high and the complexity fluctuates greatly. The current video frame is allocated with a higher bit rate for encoding only when the current video frame has higher complexity.

The computer device may acquire, in the video frame sequence, a plurality of video frames that are before the current video frame and that are in the time range corresponding to the first time granularity, and then obtain the first historical complexity corresponding to the current video frame according to the complexity corresponding to the acquired plurality of video frames. The quantity of the acquired video frames is related to a time range for bit rate control at the first time granularity. For example, assuming that a frame rate is 30 frames/s, if the time range for bit rate control at the first time granularity is one minute, that is, a bit rate of video encoding of video frames in one minute needs to be controlled, 1800 corresponding video frames in one minute before the current video frame in the video frame sequence are acquired; and if the range for bit rate control at the first time granularity is two minutes, that is, a bit rate of video encoding of video frames in two minutes needs to be controlled, 3600 corresponding video frames in two minutes before the current video frame in the video frame sequence are acquired.

In some embodiments, complexity of a video frame may be determined according to prediction residuals of video frames. Hadamard transform may be performed on the prediction residuals of the video frames and absolute values thereof are summed to obtain a sum of absolute transformed difference (SATD). The complexity of the video frame may be represented by using a value of the SATD. In this way, the computer device then may determine the first historical complexity corresponding to the current video frame according to the SATD of the acquired video frames before the current video frame. Alternatively, absolute errors of the prediction residuals of the video frames may be directly summed to obtain a sum of absolute difference (SAD). The complexity of the video frame is represented by using a value of the SAD. Alternatively, squared differences of the prediction residuals of the video frames may be directly summed to obtain a sum of squared difference (SSD). The complexity of the video frame is represented by using a value of the SSD.

S206. Acquire a current second available bit rate (or second available bit rate corresponding to the current video frame) and a current first available bit rate (or first available bit rate corresponding to the current video frame).

The second available bit rate refers to an available bit rate in a second-time-granularity bit rate control buffer used for bit rate control at the second time granularity. The second-time-granularity bit rate control buffer is used for controlling, in a time range corresponding to the second time granularity, a bit rate required for encoding of the current video frame according to complexity of video frames after the current video frame. The first available bit rate refers to an available bit rate in a first-time-granularity bit rate control buffer used for bit rate control at the first time granularity. The first-time-granularity bit rate control buffer is used for controlling, in a time range corresponding to the first time granularity, a bit rate required for encoding of the current video frame according to complexity of video frames before the current video frame.

This embodiment does not impose limitations on specific time ranges corresponding to the first-time-granularity bit rate control buffer and the second-time-granularity bit rate control buffer. The specific time range corresponding to the first-time-granularity bit rate control buffer may be 0.5 minute to 5 minutes. In order to prevent excessively intense fluctuations between bit rates used during encoding of video frames in the time range, optionally, the time range corresponding to the first-time-granularity bit rate may be 1 minute to 2 minutes. The specific time range corresponding to the second-time-granularity bit rate control buffer may be 1 second to 5 seconds. In order to reduce the delay of outputting encoded frames, optionally, the time range corresponding to the second-time-granularity bit rate may be 1 second to 2 seconds.

During video encoding, the second available bit rate and the first available bit rate are dynamic values, and cooperate with each other to implement average bit rate control in a larger time range during the video encoding. In an embodiment, before the computer device encodes the current video frame, a bit rate is adjusted between the first available bit rate and the second available bit rate (e.g., the first available bit rate and the second available bit rate are adjusted). After the encoding of the video frame is finished, an adjusted second available bit rate is then updated according to an actually occupied bit rate during the encoding of the current video frame, so as to continue to encode a next video frame based on an adjusted first available bit rate and an updated second available bit rate. Therefore, the current second available bit rate and the current first available bit rate acquired by the computer device are corresponding values after a previous frame of the current video frame is encoded.

S208. Adjust a bit rate of the second available bit rate and the first available bit rate based on the second available bit rate and the first available bit rate according to complexity of the current video frame and the first historical complexity.

As mentioned above, complexity of a video frame may be determined according to a prediction residual of the video frame. The complexity of the current video frame may be determined according to a prediction residual of the current video frame. In some embodiments, the computer device may calculate corresponding SATD, SSD, or SAD according to the prediction residual of the current video frame. At least one of the obtained SATD, SSD, or SAD is used for measuring the complexity of the current video frame.

When a bit rate is adjusted between the first available bit rate and the second available bit rate, the main basis for the adjustment is a magnitude relationship between the complexity of the current video frame and the first historical complexity corresponding to the current video frame. The value of the adjusted bit rate is related to the current second available bit rate, the current first available bit rate, the complexity of the current video frame, and the first historical complexity corresponding to the current video frame.

When the complexity of the current video frame is relatively low, it indicates that the current video frame may be encoded with a lower bit rate. The second available bit rate may be reduced and the saved bit rate is added to the first available bit rate. In this way, a bit rate during encoding of a subsequent video frame may be acquired from the first available bit rate according to complexity of the video frame. When the complexity of the current video frame is relatively high, it indicates that the current video frame requires a higher bit rate for encoding. A bit rate may be acquired from the first available bit rate and added to the second available bit rate, to improve the quality of video encoding of the current video frame. In this way, each video frame in the video frame sequence is sequentially encoded, ensuring that an average bit rate in the time range corresponding to the second time granularity conforms to requirements of a user.

S210. Update the initial quantization parameter according to the adjusted second available bit rate to obtain a current quantization parameter.

After the adjusted second available bit rate is obtained, the current quantization parameter may be obtained by updating the initial quantization parameter according to the adjusted second available bit rate. A value of the current quantization parameter is related to a cumulative encoding bit rate of video frames in the time range corresponding to the second time granularity after the current video frame. A greater estimated cumulative encoding bit rate of the video frames in the time range corresponding to the second time granularity after the current video frame indicates a greater value of the current quantization parameter and a lower bit rate actually occupied by the current video frame after the current video frame is encoded. A greater adjusted second available bit rate indicates a greater value of the current quantization parameter and a higher bit rate actually occupied by the current video frame after the current video frame is encoded.

In an embodiment, the operation of updating the initial quantization parameter according to the adjusted second available bit rate to obtain a current quantization parameter in S210 includes: obtaining a video frame sequence that is in a second time granularity detection window and that corresponds to the current video frame; and gradually increasing a value starting from the initial quantization parameter until the current quantization parameter is obtained, so that a cumulative encoding bit rate, estimated based on the video frame sequence and the current quantization parameter, and the adjusted second available bit rate conform to a preset bit rate relationship. Optionally, the condition that the cumulative encoding bit rate and the adjusted second available bit rate conform to the preset bit rate relationship may be set according to actual requirements (or may be variously set depending on embodiment). For example, the cumulative encoding bit rate may be half the adjusted second available bit rate.

The video frame sequence in the second time granularity detection window is a sequence formed by video frames in the time range corresponding to the second time granularity after the current video frame. The computer device may acquire a corresponding prediction coefficient for prediction of the previous frame of the current video frame and complexity of the video frames in the second time granularity detection window, and calculate the cumulative encoding bit rate according to the prediction coefficient, the complexity of the video frames in the video frame sequence, and the initial quantization parameter. When the current obtained cumulative encoding bit rate and the adjusted second available bit rate do not conform to the preset bit rate relationship, the initial quantization parameter is increased and the cumulative encoding bit rate is calculated again according to the prediction coefficient, the complexity of the video frames in the video frame sequence, and the increased quantization parameter, until the obtained cumulative encoding bit rate and the adjusted second available bit rate conform to the preset bit rate relationship, and then the increased quantization parameter is used as the current quantization parameter.

A time range corresponding to the second time granularity detection window coincides with the time range corresponding to the second-time-granularity bit rate control buffer. For example, if the frame rate is 30 frames/s and the second-time-granularity bit rate control buffer is used for controlling a bit rate required for encoding of video frames in 2 seconds, the time range corresponding to the second time granularity detection window is 2 seconds after the current video frame. The computer device may acquire a video frame sequence formed by 60 video frames in the 2 seconds and calculate an estimated cumulative encoding bit rate of the 60 video frames based on the current quantization parameter.

In an embodiment, the estimated cumulative encoding bit rate may be obtained through calculation using the following formula:

$$prebits = \sum_{j=1}^{M} \frac{coeff * satd_j + offset}{qp * count},$$

where prebits represents an estimated cumulative encoding bit rate calculated for M video frames in the second time granularity detection window; a value of M is related to the time range corresponding to the second-time-granularity bit rate control buffer and the frame rate; $satd_j$ represents complexity corresponding to a $j^{th}$ video frame after the current video frame; qp is a quantization parameter, and a value of qp is gradually increased starting from the initial quantization parameter; and coeff, offset, and count are all corresponding prediction coefficients for prediction of the previous video frame of the current video frame i.

It is understood that the initial quantization parameter may be set to a small value, and then the value is gradually increased starting from the initial quantization parameter, thereby improving the encoding quality of a video frame and ensuring that an actually occupied bit rate after the current video frame is encoded is not too large.

S212. Encode the current video frame according to the current quantization parameter.

In an embodiment, the operation of encoding the current video frame according to the current quantization parameter includes: obtaining a result of a quantization operation corresponding to the current video frame according to the current quantization parameter; and encoding the current video frame according to the result of the quantization operation to obtain an actually occupied bit rate corresponding to the current video frame (or encoding the current video frame by performing a quantization operation on the current video frame according to the current quantization parameter).

After the current quantization parameter is obtained by updating the initial quantization parameter according to the adjusted second available bit rate, a result of a quantization operation may be obtained according to a correspondence between a quantization parameter and a quantization operation. The current video frame is encoded according to the result of the quantization operation. For example, generally, a principle of quantization is expressed by using the following formula: FQ=round(y/Qoperation); where y is a prediction residual corresponding to a video frame before quantization, Qoperation is a quantization operation, and FQ is a quantized value of y. The Round(x) function means performing Banker's rounding on a quantized value. For example, when a last digit of the quantized value is less than or equal to four, the quantized value is rounded down; when the last digit of the quantized value is greater than or equal to six, the quantized value is rounded up; when the last digit of the quantized value is five, if there is a number behind the digit five, the quantized value is rounded up; if there is no number behind the digit five, and a previous number of the digit five is odd, the quantized value is rounded up; if the previous number of the digit five is even, the quantized value is rounded down. The correspondence between the quantization parameter and the quantization operation may be specifically set according to a requirement (or variously set depending on an embodiment). For example, in the current video encoding standards, for brightness encoding, the quantization parameter has 52 values that are integers from 0 to 51. The result of the quantization operation increases as the quantization parameter increases. Each time the quantization parameter is increased by 6, the result of the quantization operation is doubled. A greater current quantization parameter indicates a lower bit rate required for the encoding of the current video frame; on the contrary, a smaller current quantization parameter indicates a higher bit rate required for the encoding of the current video frame.

In the foregoing video encoding method, the first available bit rate may represent status of an available bit rate at the first time granularity. A combination of the first available bit rate and the second available bit rate may achieve bit rate control at the first time granularity and further achieve bit rate allocation in a larger time range, rendering the bit rate allocation more uniform and significantly improving encoding quality. During encoding, the first historical complexity corresponding to the current video frame is acquired. Based on the above, encoding complexity of the current video frame at the first time granularity is predicted according to the complexity of the current video frame, the current second available bit rate, and the current first available bit rate, so as to adjust the second available bit rate. The current quantization parameter corresponding to the current video frame then may be determined according to the adjusted second available bit rate. Finally, the current video frame is encoded according to the current quantization parameter.

Figure 3:
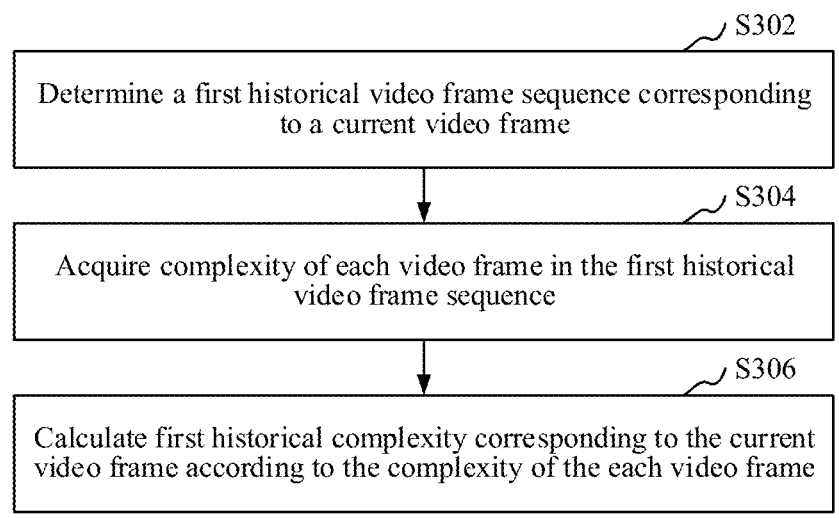
FIG. 3 is a schematic flowchart of operations of calculating first historical complexity corresponding to a current video frame according to an embodiment.

In an embodiment, as shown in FIG. 3, the operation of calculating first historical complexity corresponding to the current video frame in S204 includes the following operations S302-S306:

S302. Determine a first historical video frame sequence corresponding to the current video frame.

The computer device may acquire, in a video stream, the video frames that are in the time range corresponding to the first time granularity and that are before the current video frame. Because the video frames are in front of the current video frame, a video frame sequence formed by the video frames is referred to as the first historical video frame sequence.

The time range corresponding to the first time granularity is the same during encoding of each video frame. The time range corresponding to the first time granularity coincides with the time range corresponding to the first-time-granularity bit rate control buffer. For example, if the time range corresponding to the first-time-granularity bit rate control buffer is 1 minute, the first historical video frame sequence is a sequence formed by video frames in 1 minute after the current video frame. Assuming that a frame rate is 30 frames/s, when a current video frame i is encoded, a sequence formed by video frames from the 1800$^{th}$ frame to the first frame before the current video frame i is determined as the first historical video frame sequence corresponding to the current video frame i.

The term "current video frame" in the disclosure is used for describing a video frame that is to be processed or being currently processed by a video encoder. A video frame indicated by the term "current video frame" may change dynamically (depending on a context). For example, when a "next video frame" of the "current video frame" is processed, the "next video frame" may refer to a new current video frame and the original "current video frame" may refer to a new previous video frame. Because the current video frame is a dynamically changing video frame, the corresponding first historical video frame sequence also changes dynamically relative to the current video frame.

S304. Acquire complexity of each video frame in the first historical video frame sequence.

Specifically, when the each video frame in the first historical video frame sequence is encoded, the complexity of the each video frame is already calculated. Therefore, when the current video frame is encoded, the computer device may directly acquire the complexity of such video frames. The manner of calculating complexity of a video frame is mentioned above, and is not repeated herein again.

S306. Calculate the first historical complexity corresponding to the current video frame according to the complexity of the each video frame.

After the complexity of the video frames in the first historical video frame sequence is acquired, the first historical complexity corresponding to the current video frame may be obtained according to the complexity of the each video frame. The first historical complexity includes first historical average complexity and a first historical complexity fluctuation degree.

Figure 4:
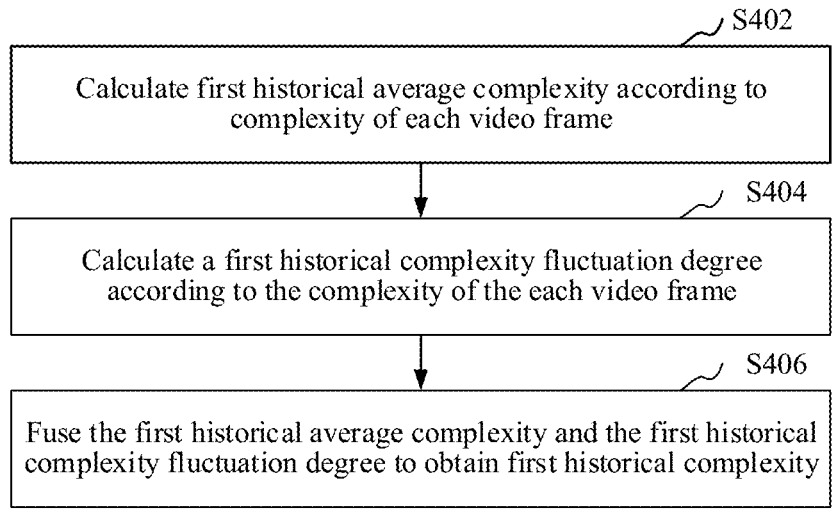
FIG. 4 is a schematic flowchart of operations of calculating first historical complexity corresponding to a current video frame according to complexity of each video frame according to an embodiment.

In an embodiment, as shown in FIG. 4, the operation of calculating the first historical complexity corresponding to the current video frame according to the complexity of the each video frame in S306 includes the following operations S402-S406.

S402. Calculate first historical average complexity according to the complexity of the each video frame.

After the complexity of the video frames is obtained, an average value of the complexity of the video frames may be calculated and the obtained average value is used as the first historical average complexity. Higher first historical average complexity indicates that higher overall complexity of the encoded video frames before the current video frame. The current video frame is allocated with a higher bit rate for video encoding only when the current video frame has higher complexity.

In an embodiment, the first historical average complexity may be obtained through calculation using the following formula:

$$satdavg_i = \frac{\sum_{j=1}^{N} satd_j}{N},$$

where $satdavg_i$ represents first historical average complexity obtained through calculation according to N video frames before a current video frame i; and $satd_j$ represents complexity of an $j^{th}$ video frame before the current video frame i.

S404. Calculate a first historical complexity fluctuation degree according to the complexity of the each video frame.

After the complexity of the each video frame is obtained, a complexity fluctuation of the each video frame in the time range corresponding to the first time granularity may be calculated according to the complexity of the each video frame, to be used as the first historical complexity fluctuation. Then a difference between the first historical complexity fluctuation and the first historical average complexity is calculated and the obtained difference is used as the first historical complexity fluctuation degree. A greater first historical complexity fluctuation degree indicates a more violent fluctuation, and a smaller first historical complexity fluctuation degree indicates a milder fluctuation. When the first historical complexity fluctuation degree is relatively high, the current video frame is allocated with a higher bit rate for video encoding only when the current video frame has higher complexity.

In an embodiment, the first historical complexity fluctuation is obtained through calculation using the following formula:

$$satd\text{var}_i = \frac{\sum_{j=1}^{N} satd_j^2}{\sum_{j=1}^{N} satd_j},$$

where satd var$_i$ represents a first historical complexity fluctuation obtained through calculation according to N video frames before a current video frame i; and satd$_j$ represents complexity of a j$^{th}$ video frame before the current video frame i. Then the first historical complexity fluctuation degree may be represented by using satdavg$_i$–satd var$_i$.

S406. Fuse the first historical average complexity and the first historical complexity fluctuation degree to obtain the first historical complexity.

The first historical average complexity and the first historical complexity fluctuation degree may be comprehensively considered in obtaining the first historical complexity corresponding to the current video frame through calculation. In this way, when the average complexity of the video frames in the time range corresponding to the first time granularity is relatively high and the complexity fluctuates greatly, the current video frame is allocated with a higher bit rate only when the current video frame has higher complexity.

In an embodiment, the first historical complexity corresponding to the current video frame is obtained through calculation using the following formula:

$$Pcplx_i = satd\text{avg}_i + w*(satd\text{ var}_i - satd\text{avg}_i),$$

where Pcplx$_i$ represents first historical complexity corresponding to a current video frame i; and w represents a preset weight coefficient of fluctuation degree.

In the foregoing embodiments, statistics about the complexity of the video frames in the time range corresponding to the first time granularity before the current video frame are collected. The first historical complexity obtained through statistics is used for measuring whether the current video frame needs a higher or lower bit rate for video encoding.

Figure 5:
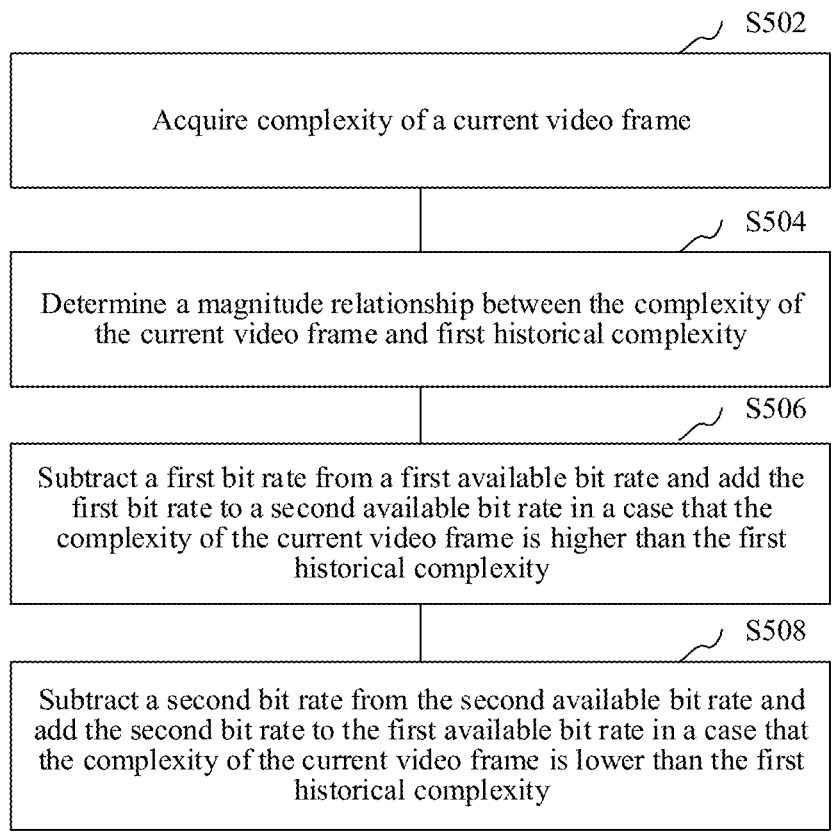
FIG. 5 is a schematic flowchart of operations of adjusting a bit rate between a first available bit rate and a second available bit rate according to an embodiment.

As shown in FIG. 5, the operation of adjusting a bit rate between the second available bit rate and the first available bit rate based on the second available bit rate and the first available bit rate (which, for example, may also refer to the operation of adjusting the second available bit rate and the first available bit rate) according to complexity of the current video frame and the first historical complexity in S208 includes the following operations S502-S508.

S502. Acquire the complexity of the current video frame.

The complexity of the current video frame may be determined according to the prediction residual of the current video frame as mentioned above.

S504. Determine a magnitude relationship between the complexity of the current video frame and the first historical complexity.

The first historical complexity may be subtracted from the complexity of the current video frame to obtain a complexity fluctuation value of the current video frame. According to such a value, it may be determined whether a higher or lower bit rate is needed to encode the current video frame.

In an embodiment, the magnitude relationship between the complexity of the current video frame and the first historical complexity may be expressed in the following formula:

$$AdRation = satd_i - Pcplx_i = satd_i - [satd\text{avg}_i + w*(satd\text{ var}_i - satd\text{avg}_i)],$$

where satd$_i$ represents the complexity of the current video frame. It may be seen that when AdRation is greater than 0, it indicates that the complexity of the current video frame is higher than the first historical complexity, and when AdRation is less than 0, it indicates that the complexity of the current video frame is lower than the first historical complexity.

S506. Subtract a first bit rate from the first available bit rate and add the first bit rate to the second available bit rate in a case that the complexity of the current video frame is higher than the first historical complexity.

When the complexity of the current video frame is higher than the first historical complexity, it indicates that a higher bit rate may be allocated to the current video frame for video encoding. Therefore, the first bit rate is acquired from the first available bit rate and added to the second available bit rate. In this way, a smaller quantization parameter may be obtained to encode the current video frame.

S508. Subtract a second bit rate from the second available bit rate and add the second bit rate to the first available bit rate in a case that the complexity of the current video frame is lower than the first historical complexity.

When the complexity of the current video frame is lower than the first historical complexity, it indicates that the current video frame may be encoded with a lower bit rate. Therefore, the second bit rate is acquired from the second available bit rate through compression and the saved second bit rate is added to the first available bit rate. In this way, a greater quantization parameter may be obtained to encode the current video frame.

Figure 6:
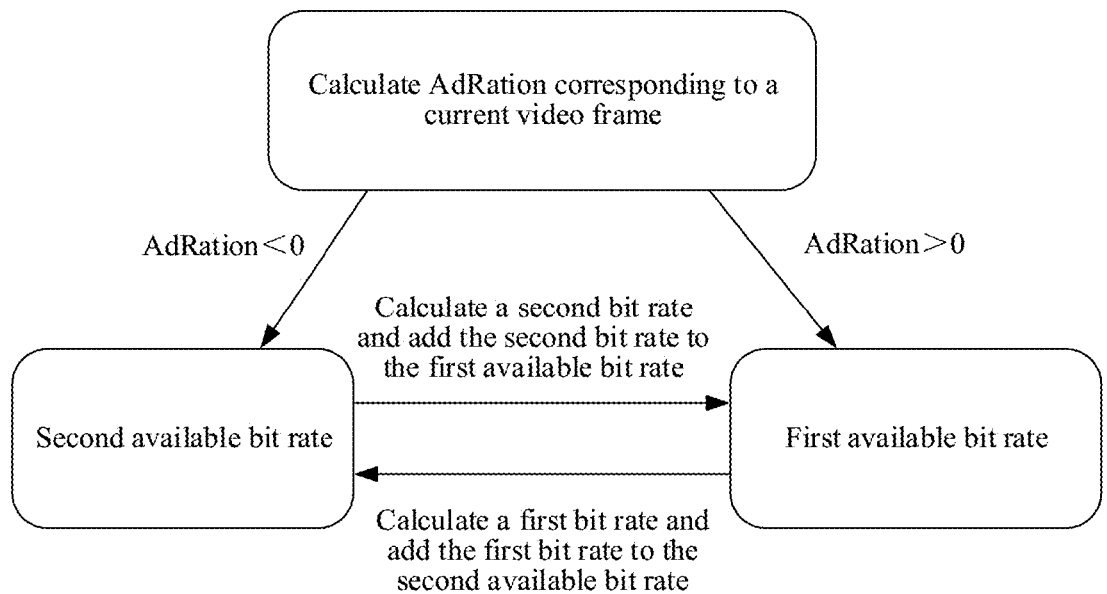
FIG. 6 is a schematic diagram of adjusting a first available bit rate and a second available bit rate according to an embodiment.

FIG. 6 is a schematic diagram of adjusting a first available bit rate and a second available bit rate according to an embodiment. Referring to FIG. 6, according to AdRation corresponding to the current video frame, when AdRation is greater than 0, the first bit rate is calculated. The first bit rate is subtracted from the first available bit rate and added to the second available bit rate. When AdRation is less than 0, the second bit rate is calculated. The second bit rate is subtracted from the second available bit rate and added to the first available bit rate.

In an embodiment, the first bit rate is positively correlated with the current first available bit rate; and the first bit rate is positively correlated with the difference between the complexity of the current video frame and the first historical complexity.

A value of a bit rate that may be subtracted from the first available bit rate and added to the second available bit rate is related to the current first available bit rate, and is also related to the difference between the complexity of the current video frame and the first historical complexity. A higher current first available bit rate indicates that a higher first bit rate may be acquired from the first available bit rate; and a greater difference between the complexity of the current video frame and the first historical complexity indicates that a higher first bit rate may be acquired from the first available bit rate.

In an embodiment, in a case that the second available bit rate added with the first bit rate exceeds a maximum value corresponding to the second available bit rate, the second available bit rate is adjusted to be the maximum value corresponding to the second available bit rate.

The maximum value corresponding to the second available bit rate is determined according to a target bit rate corresponding to a target video frame sequence to which the current video frame belongs, and is generally set to 1 to 2 times of the target bit rate. The target bit rate may be an average bit rate that a user expects according to current bandwidth and network situations.

Because the quantization parameter used during the encoding of the current video frame is determined according to the adjusted second available bit rate, in order to prevent a high bit rate from being actually occupied due to encoding of the current video frame with a small quantization parameter, the adjusted second available bit rate cannot exceed the maximum value corresponding to the second available bit rate.

In an embodiment, the first bit rate is obtained through calculation using the following formula:

$$Adm\_Bits = Min(\alpha * AdRation * m\_buffer, s\_buffer_{max} - s\_buffer),$$

where Adm_Bits represents the first bit rate to be subtracted from the first available bit rate; AdRation represents the difference between the complexity of the current video frame and the first historical complexity; m_buffer represents the current first available bit rate; s_buffer represents the current second available bit rate; $s\_buffer_{max}$ represents the maximum value corresponding to the second available bit rate; α represents a preset equalization adjustment parameter; and Min represents a function for taking a minimum value. α is generally set to the reciprocal of the number n of encoding threads, that is, $$\frac{1}{n}.$$

In an embodiment, the second bit rate is positively correlated with the current second available bit rate; the second bit rate is positively correlated with a degree of fullness of the second available bit rate; and the second bit rate is positively correlated with the difference between the complexity of the current video frame and the first historical complexity.

A value of a bit rate that may be subtracted from the second available bit rate and added to the first available bit rate is related to the current second available bit rate, related to the difference between the complexity of the current video frame and the first historical complexity, and also related to the degree of fullness of the current second available bit rate. A higher current second available bit rate indicates that a higher second bit rate may be acquired from the second available bit rate; and a greater difference between the first historical complexity and the complexity of the current video frame indicates that a higher second bit rate may be acquired from the second available bit rate. The degree of fullness of the second available bit rate refers to a degree of fullness of the second-time-granularity bit rate control buffer and may be expressed by a ratio of the current second available bit rate to the maximum value corresponding to the second available bit rate. A higher degree of fullness indicates that a higher second bit rate may be acquired from the second available bit rate.

In an embodiment, in a case that the first available bit rate exceeds a maximum value corresponding to the first available bit rate after the second bit rate is added, the first available bit rate is adjusted to be the maximum value corresponding to the first available bit rate.

Similarly, the maximum value corresponding to the first available bit rate is related to the target bit rate corresponding to the target video frame sequence to which the current video frame belongs. A higher target bit rate indicates a greater maximum value corresponding to the first available bit rate.

During encoding of subsequent video frames, if a bit rate is to be acquired from the first available bit rate and added to the second available bit rate, the acquired bit rate is positively correlated with a value of the first available bit rate after the last adjustment. Therefore, in order to prevent a high bit rate from being actually occupied during encoding of the subsequent video frames due to a high second available bit rate after subsequent adjustment, the adjusted first available bit rate cannot exceed the maximum value corresponding to the first available bit rate.

In an embodiment, the maximum value corresponding to the first available bit rate may be expressed using the following formula:

$$m\_buffer_{max} = \lambda * seconds * bitrate,$$

where data smoothing means that an actual average bit rate corresponding to a duration after the beginning of encoding is a target bit rate, seconds represents the duration of data smoothing (e.g., seconds is generally set to 30 s to 120 s), bitrate represents the target bit rate, λ represents the intensity of the first-time-granularity bit rate control buffer, $m\_buffer_{max}$ may be controlled through λ to adjust the intensity of bit rate control at first time granularity, and λ is generally set to 0.5. For example, assuming that λ is set to 0.5 and seconds is set to 100 s, $m\_buffer_{max}$ corresponding to the bit rate control of video encoding in a time range of one minute is 50*bitrate, and $m\_buffer_{max}$ corresponding to the bit rate control of video encoding in a time range of two minutes is 2*50*bitrate.

In an embodiment, the second bit rate is obtained through calculation using the following formula:

$$Ads\_Bits = Min\left(\alpha * |AdRation| * s\_buffer * \frac{s\_buffer}{s\_buffer_{max}}, m\_buffer_{max} - m\_buffer\right),$$

where Ads_Bits represents the second bit rate to be subtracted from the second available bit rate; AdRation represents the difference between the complexity of the current video frame and the first historical complexity; $m\_buffer_{max}$ represents the maximum value corresponding to the first available bit rate; and $$\frac{s\_buffer}{s\_buffer_{max}}$$

represents the degree of fullness of the second available bit rate.

Figure 7:
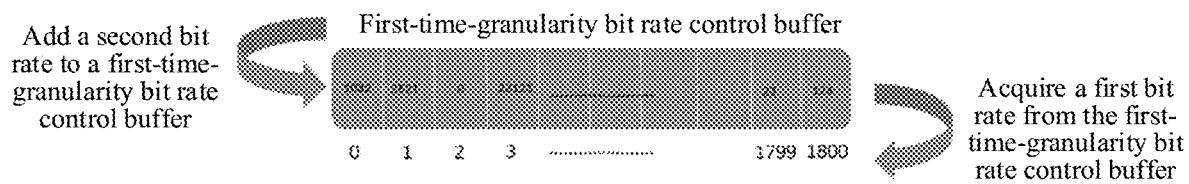
FIG. 7 is a schematic diagram of adding, to a first available bit rate, bit rates saved during encoding of video frames before a current video frame according to an embodiment.

FIG. 7 is a schematic diagram of adding, to a first available bit rate, bit rates saved during encoding of video frames before a current video frame according to an embodiment. Referring to FIG. 7, a frame rate of the target video frame sequence is 30 frames/s, and the time range corresponding to the first time granularity is 1 minute. In this case, the first available bit rate includes a bit rate saved during encoding of the current video frame and bit rates saved during encoding of 1799 video frames before the current video frame. Bit rates saved by the 1800 video frames are 1022, 3521, 0, 22121, . . . , 22, 124. When the current video frame is encoded, a bit rate may be acquired from the first available bit rate.

In an embodiment, after the operation of encoding the current video frame according to the current quantization parameter in S212, the video encoding method further includes: acquiring a target bit rate corresponding to a target video frame sequence to which the current video frame belongs; calculating an allocable bit rate per frame according to the target bit rate and a frame rate of the target video frame sequence; acquiring an actually occupied bit rate corresponding to the current video frame that has been encoded; and updating the adjusted second available bit rate according to the average allocable bit rate per frame and the actually occupied bit rate to obtain a second available bit rate corresponding to a next video frame.

The target bit rate is an expected bit rate specified by a user. The average allocable bit rate per frame refers to a bit rate expected to be occupied by each frame in an ideal case in which complexity of the video frame is not considered. The average allocable bit rate per frame may be expressed by a product of a duration occupied by each frame and the target bit rate. The duration occupied by each frame may be expressed by the reciprocal of the frame rate. The actually occupied bit rate refers to a bit rate actually occupied after the current video frame is encoded according to the current quantization parameter. Specifically, when the next video frame is encoded, an acquired current second available bit rate is an updated second available bit rate.

In an embodiment, if the updated second available bit rate is greater than a maximum value of the second available bit rate, the maximum value of the second available bit rate is used as the second available bit rate corresponding to the next video frame.

In an embodiment, the operation of updating the adjusted second available bit rate according to the average allocable bit rate per frame and the actually occupied bit rate may be expressed using the following formula:

$$s\_buffer_{new} = Min(s\_buffer_{adjust} - bits + duration * bitrate, s\_buffer_{max}),$$

where $s\_buffer_{adjust}$ represents the second available bit rate obtained after the bit rate is adjusted between the second available bit rate and the first available bit rate; bits represents the actually occupied bit rate corresponding to the current video frame that has been encoded; duration represents the duration of the each frame; and bitrate represents the target bit rate. For example, if a frame rate of the target video frame sequence is 30 frames/s, the duration duration occupied by the each frame is 1/30 s and the average allocable bit rate per frame is 1/30*bitrate.

Figure 8:
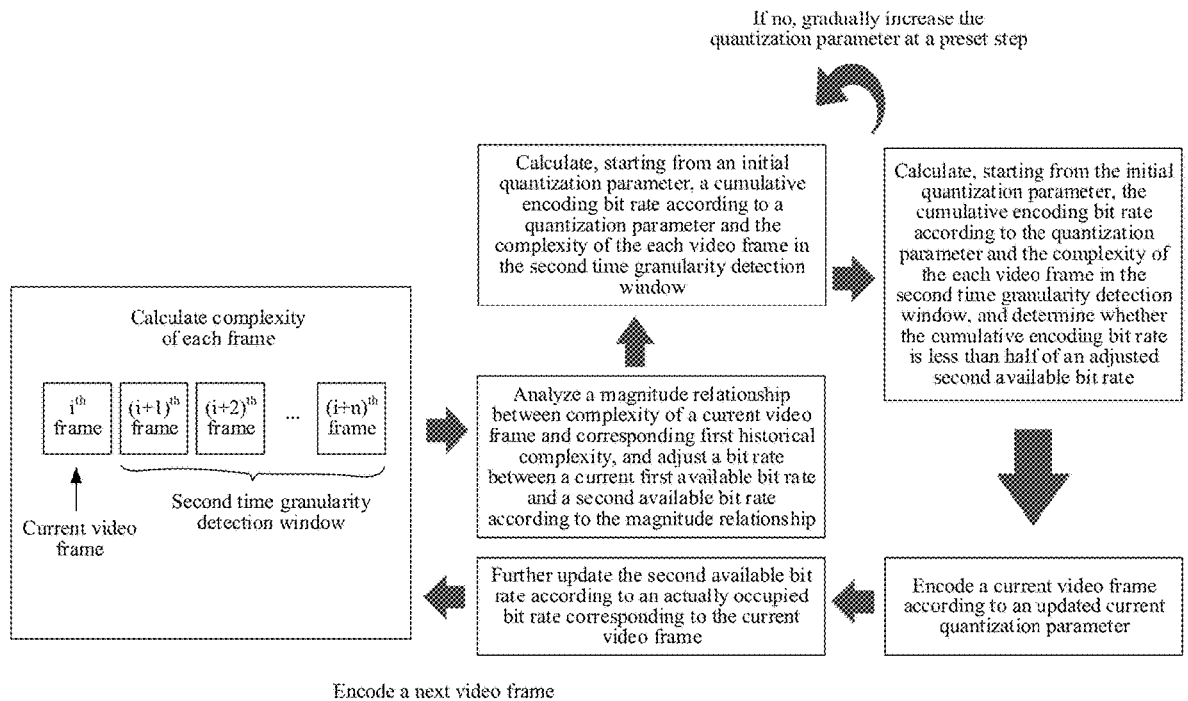
FIG. 8 is a block flowchart of a video encoding method according to an embodiment.

FIG. 8 is a block flowchart of a video encoding method in an embodiment. Referring to FIG. 8, first, complexity of a current video frame i and complexity of video frames in a second time granularity detection window n are calculated, a value of n being related to a time range corresponding to a second time granularity, the complexity being $satd_i$, $satd_{i+1}$, $satd_{i+2}$, . . . and $satd_{i+n}$; then, first historical complexity corresponding to the current video frame i is calculated, a magnitude relationship between complexity $satd_i$ of the current video frame i and the corresponding first historical complexity is analyzed, and a bit rate is adjusted between a first available bit rate and a second available bit rate (e.g., the first available bit rate and the second available bit rate are adjusted) according to the magnitude relationship; next, starting from an initial quantization parameter, a cumulative encoding bit rate is calculated according to a quantization parameter and the complexity of each video frame in the second time granularity detection window, and it is determined whether the obtained cumulative encoding bit rate is less than half of an adjusted second available bit rate; if yes, the current video frame i is encoded according to a current quantization parameter obtained after updating; if no, the quantization parameter is increased gradually until the cumulative encoding bit rate obtained through calculation according to the current quantization parameter is less than half of the adjusted second available bit rate; next, the current video frame is encoded according to the obtained current quantization parameter, the second available bit rate is further updated according to an actually occupied bit rate corresponding to the current video frame that has been encoded, and video encoding may be performed on a next frame based on an updated second available bit rate.

The following describes the video encoding method provided in this embodiment by using an example that the first available bit rate is a minute-level available bit rate, the second available bit rate is a second-level available bit rate, a time range corresponding to the minute-level available bit rate is 1 minute, a time range corresponding to the second-level available bit rate is 1 second, a frame rate is 30 frames/s, and the current video frame is the $1900^{th}$ frame.

1. Acquire a current minute-level available bit rate and a current second-level available bit rate.

2. Calculate complexity of the $1900^{th}$ frame according to a prediction residual of the $1900^{th}$ frame to obtain complexity of frames from the $100^{th}$ frame to the $1899^{th}$ frame, calculate an average complexity value and a complexity fluctuation of the frames from the $100^{th}$ frame to the $1899^{th}$ frame, and obtain statistical historical complexity according to the average complexity value and the complexity fluctuation.

3. Calculate a bit rate that needs to be subtracted from the current minute-level available bit rate according to the current minute-level available bit rate and a difference between the complexity of the $1900^{th}$ frame and the historical complexity and add the subtracted bit rate to the second-level available bit rate if the complexity of the $1900^{th}$ frame is higher than the statistical historical complexity; and calculate a bit rate that needs to be subtracted from the current second-level available bit rate according to an absolute value of the difference between the complexity of the $1900^{th}$ frame and the historical complexity, the current second-level available bit rate, and a degree of fullness of the second-level available bit rate, and add the subtracted bit rate to the minute-level available bit rate if the complexity of the 1900$^{th}$ frame is lower than the statistical historical complexity.

4. Calculate, according to prediction residuals of frames from the 1901$^{st}$ frame to the 1960$^{th}$ frame, complexity of each frame, calculate a cumulative encoding bit rate based on an initial quantization parameter and the complexity of each frame, and determine a current quantization parameter according to the cumulative encoding bit rate and an adjusted second-level available bit rate.

5. Encode the 1900$^{th}$ frame according to the current quantization parameter.

6. Update the second-level available bit rate according to a bit rate actually occupied by the 1900$^{th}$ frame after the encoding.

7. Encode the 1901$^{st}$ frame according to above operations 1 to 6 based on an updated second-level available bit rate and an adjusted minute-level available bit rate.

In an example embodiment, a video encoding method specifically includes the following operations:

acquiring a current video frame to be encoded and an initial quantization parameter;

determining a first historical video frame sequence corresponding to the current video frame;

acquiring complexity of each video frame in the first historical video frame sequence;

calculating first historical average complexity according to the complexity of the each video frame;

calculating a first historical complexity fluctuation degree according to the complexity of the each video frame;

fusing the first historical average complexity and the first historical complexity fluctuation degree to obtain first historical complexity;

acquiring a current second available bit rate (or a second available bit rate corresponding to the current video frame) and a current first available bit rate (or a first available bit rate corresponding to the current video frame);

acquiring complexity of the current video frame;

determining a magnitude relationship between the complexity of the current video frame and the first historical complexity;

subtracting a first bit rate from the first available bit rate and adding the first bit rate to the second available bit rate in a case that the complexity of the current video frame is higher than the first historical complexity and adjusting, in a case that the second available bit rate added with the first bit rate exceeds a maximum value corresponding to the second available bit rate, the second available bit rate to be the maximum value corresponding to the second available bit rate;

subtracting a second bit rate from the second available bit rate and adding the second bit rate to the first available bit rate in a case that the complexity of the current video frame is lower than the first historical complexity and adjusting, in a case that the first available bit rate added with the second bit rate exceeds a maximum value corresponding to the first available bit rate, the first available bit rate to be the maximum value corresponding to the first available bit rate;

acquiring a video frame sequence that is in a second time granularity detection window and that corresponds to the current video frame;

gradually increasing a value starting from the initial quantization parameter until the current quantization parameter is obtained, so that a cumulative encoding bit rate, estimated based on the video frame sequence and the current quantization parameter, and the adjusted second available bit rate conform to a preset bit rate relationship;

obtaining a result of a quantization operation corresponding to the current video frame according to the current quantization parameter;

encoding the current video frame according to the result of the quantization operation to obtain an actually occupied bit rate corresponding to the current video frame;

acquiring a target bit rate corresponding to a target video frame sequence to which the current video frame belongs;

calculating an average allocable bit rate per frame according to the target bit rate and a frame rate of the target video frame sequence; and updating the adjusted second available bit rate according to the average allocable bit rate per frame and the actually occupied bit rate to obtain a second available bit rate corresponding to a next video frame.

In the video encoding method, the first available bit rate may represent status of an available bit rate at the first time granularity, the second available bit rate may indicate status of an available bit rate at the second time granularity, and the second time granularity is a finer time unit relative to the first time granularity. A combination of the first bit rate and the second available bit rate may achieve bit rate control at the first time granularity and further achieve bit rate allocation in a larger time range, rendering the bit rate allocation more uniform and significantly improving encoding quality. During encoding, the first historical complexity corresponding to the current video frame is acquired. Based on the above, encoding complexity of the current video frame at the first time granularity is predicted according to the complexity of the current video frame, the current second available bit rate, and the current first available bit rate, so as to adjust the second available bit rate. The current quantization parameter corresponding to the current video frame then may be determined according to the adjusted second available bit rate. Finally, the current video frame is encoded according to the current quantization parameter.

It is to be understood that, although the operations in the foregoing embodiments are displayed sequentially according to indication of arrows in the flowcharts, these operations are not necessarily performed sequentially according to the sequence indicated by the arrows. Unless explicitly specified herein, the operations are performed without any strict sequence limitation, and may be performed in another sequence. In addition, at least some operations in the flowcharts may include a plurality of suboperations or a plurality of stages. The suboperations or the stages are not necessarily performed at the same moment, but may be performed at different moments. The suboperations or the stages are not necessarily performed in sequence, but may be performed in turn or alternately with another operation or at least some of suboperations or stages of the another operation.

Figure 9:
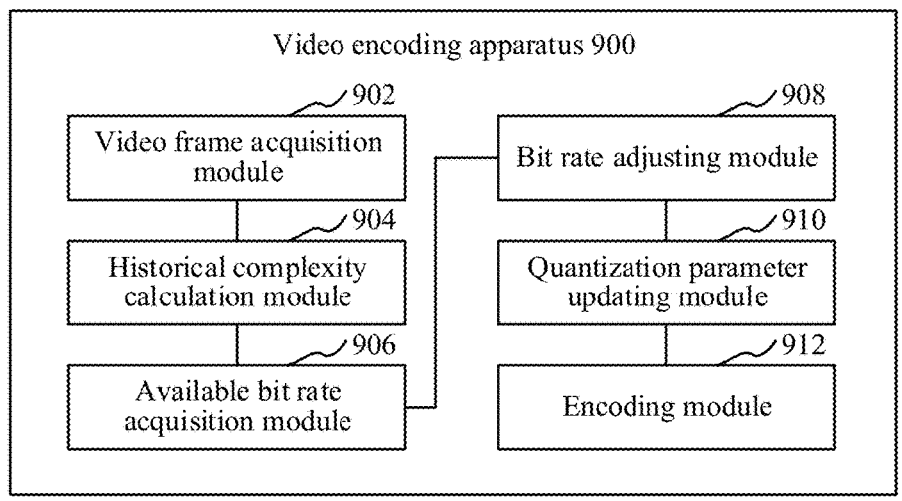
FIG. 9 is a structural block diagram of a video encoding apparatus according to an embodiment.

In an embodiment, as shown in FIG. 9, a video encoding apparatus 900 is provided, including a video frame acquisition module 902, a historical complexity calculation module 904, an available bit rate acquisition module 906, a bit rate adjusting module 908, a quantization parameter updating module 910, and an encoding module 912, where the video frame acquisition module 902 is configured to acquire a current video frame to be encoded and an initial quantization parameter;

the historical complexity calculation module 904 is configured to calculate first historical complexity corresponding to the current video frame at a first time granularity;

the available bit rate acquisition module 906 is configured to acquire a current second available bit rate at a second time granularity and a current first available bit rate at the first time granularity, the second time granularity being a finer time unit relative to the first time granularity;

the bit rate adjusting module 908 is configured to adjust a bit rate between the second available bit rate and the first available bit rate based on the second available bit rate and the first available bit rate according to complexity of the current video frame and the first historical complexity;

the quantization parameter updating module 910 is configured to update the initial quantization parameter according to an adjusted second available bit rate to obtain a current quantization parameter; and the encoding module 912 is configured to encode the current video frame according to the current quantization parameter.

In an embodiment, the historical complexity calculation module 904 is further configured to determine a first historical video frame sequence corresponding to the current video frame; acquire complexity of each video frame in the first historical video frame sequence; and calculate the first historical complexity corresponding to the current video frame according to the complexity of the each video frame.

In an embodiment, the historical complexity calculation module 904 is further configured to calculate first historical average complexity according to the complexity of the each video frame; calculate a first historical complexity fluctuation degree according to the complexity of the each video frame; and fuse the first historical average complexity and the first historical complexity fluctuation degree to obtain the first historical complexity.

In an embodiment, the first historical complexity corresponding to the current video frame is obtained through calculation using the following formula:

$$Pcplx_i = satdavg_i + w * (satdvar_i - satdavg_i);$$

$$satdavg_i = \frac{\sum_{j=1}^{N} satd_j}{N};$$

$$satdvar_i = \frac{\sum_{j=1}^{N} satd_j^2}{\sum_{j=1}^{N} satd_j};$$

where $Pcplx_i$ represents first historical complexity corresponding to a current video frame i; $satdavg_i$ represents first historical average complexity obtained through calculation according to N video frames before the current video frame i; $satd\,var_i$ represents a first historical complexity fluctuation obtained through calculation according to the N video frames before the current video frame i; $satdavg_i - satd\,var_i$ represents a first historical complexity fluctuation degree; $satd_j$ represents complexity of a $j^{th}$ video frame before the current video frame i; and w represents a preset weight coefficient of fluctuation degree.

In an embodiment, the bit rate adjusting module 908 is further configured to acquire the complexity of the current video frame; determine a magnitude relationship between the complexity of the current video frame and the first historical complexity; subtract a first bit rate from the first available bit rate and add the first bit rate to the second available bit rate in a case that the complexity of the current video frame is higher than the first historical complexity; and subtract a second bit rate from the second available bit rate and add the second bit rate to the first available bit rate in a case that the complexity of the current video frame is lower than the first historical complexity. In other words, subtraction by the bit rate adjusting module 908 includes subtracting a first bit rate from the first available bit rate and adding the first bit rate to the second available bit rate based on the complexity of the current video frame being higher than the first historical complexity; or subtracting a second bit rate from the second available bit rate and adding the second bit rate to the first available bit rate based on the complexity of the current video frame being lower than the first historical complexity.

In an embodiment, the first bit rate is positively correlated with the current first available bit rate; and the first bit rate is positively correlated with the difference between the complexity of the current video frame and the first historical complexity.

In an embodiment, the second bit rate is positively correlated with the current second available bit rate; the second bit rate is positively correlated with a degree of fullness of the second available bit rate; and the second bit rate is positively correlated with the difference between the complexity of the current video frame and the first historical complexity.

In an embodiment, the bit rate adjusting module 908 is further configured to adjust, in a case that the second available bit rate added with the first bit rate exceeds a maximum value corresponding to the second available bit rate, the second available bit rate to be the maximum value corresponding to the second available bit rate; and adjust, in a case that the first available bit rate added with the second bit rate exceeds a maximum value corresponding to the first available bit rate, the first available bit rate to be the maximum value corresponding to the first available bit rate.

In an embodiment, the first bit rate and the second bit rate are obtained through calculation using the following formulas:

$$Adm\_Bits = Min(\alpha * AdRation * m\_buffer, s\_buffer_{max} - s\_buffer);$$

$$Ads\_Bits = Min\left(\alpha * |AdRation| * s\_buffer * \frac{s\_buffer}{s\_buffer_{max}}, m\_buffer_{max} - m\_buffer\right);$$

where Adm_Bits represents the first bit rate to be subtracted from the first available bit rate; Ads_Bits represents the second bit rate to be subtracted from the second available bit rate; AdRation represents a difference between the complexity of the current video frame and the first historical complexity; m_buffer represents the current first available bit rate; s_buffer represents the current second available bit rate; $m\_buffer_{max}$ represents the maximum value corresponding to the first available bit rate; $s\_buffer_{max}$ represents the maximum value corresponding to the second available bit rate;

$$\frac{s\_buffer}{s\_buffer_{max}}$$

represents the degree of fullness of the second available bit rate; $\alpha$ represents a preset equalization adjustment parameter; and Min represents a function for taking a minimum value.

In an embodiment, the quantization parameter updating module 910 is further configured to obtain a video frame sequence that is in a second time granularity detection window and that corresponds to the current video frame; and gradually increase a value starting from the initial quantization parameter until the current quantization parameter is obtained, so that a cumulative encoding bit rate, estimated based on the video frame sequence and the current quantization parameter, and the adjusted second available bit rate conform to a preset bit rate relationship.

In an embodiment, the encoding module 912 is further configured to obtain a result of a quantization operation corresponding to the current video frame according to the current quantization parameter; and encode the current video frame according to the result of the quantization operation to obtain an actually occupied bit rate corresponding to the current video frame.

In an embodiment, the video encoding apparatus 900 further includes a second available bit rate updating module. The second available bit rate updating module is configured to acquire a target bit rate corresponding to a target video frame sequence to which the current video frame belongs; calculate an allocable bit rate per frame according to the target bit rate and a frame rate of the target video frame sequence; acquire an actually occupied bit rate corresponding to the current video frame that has been encoded; and update the adjusted second available bit rate according to the average allocable bit rate per frame and the actually occupied bit rate to obtain a second available bit rate corresponding to a next video frame.

Through the video encoding apparatus 900, the first available bit rate may represent status of an available bit rate at the first time granularity. A combination of the first available bit rate and the second available bit rate may achieve bit rate control at the first time granularity and further achieve bit rate allocation in a larger time range, rendering the bit rate allocation more uniform and significantly improving encoding quality. During encoding, the first historical complexity corresponding to the current video frame is acquired. Based on the above, encoding complexity of the current video frame at the first time granularity is predicted according to the complexity of the current video frame, the current second available bit rate, and the current first available bit rate, so as to adjust the second available bit rate. The current quantization parameter corresponding to the current video frame then may be determined according to the adjusted second available bit rate. Finally, the current video frame is encoded according to the current quantization parameter.

Figure 10:
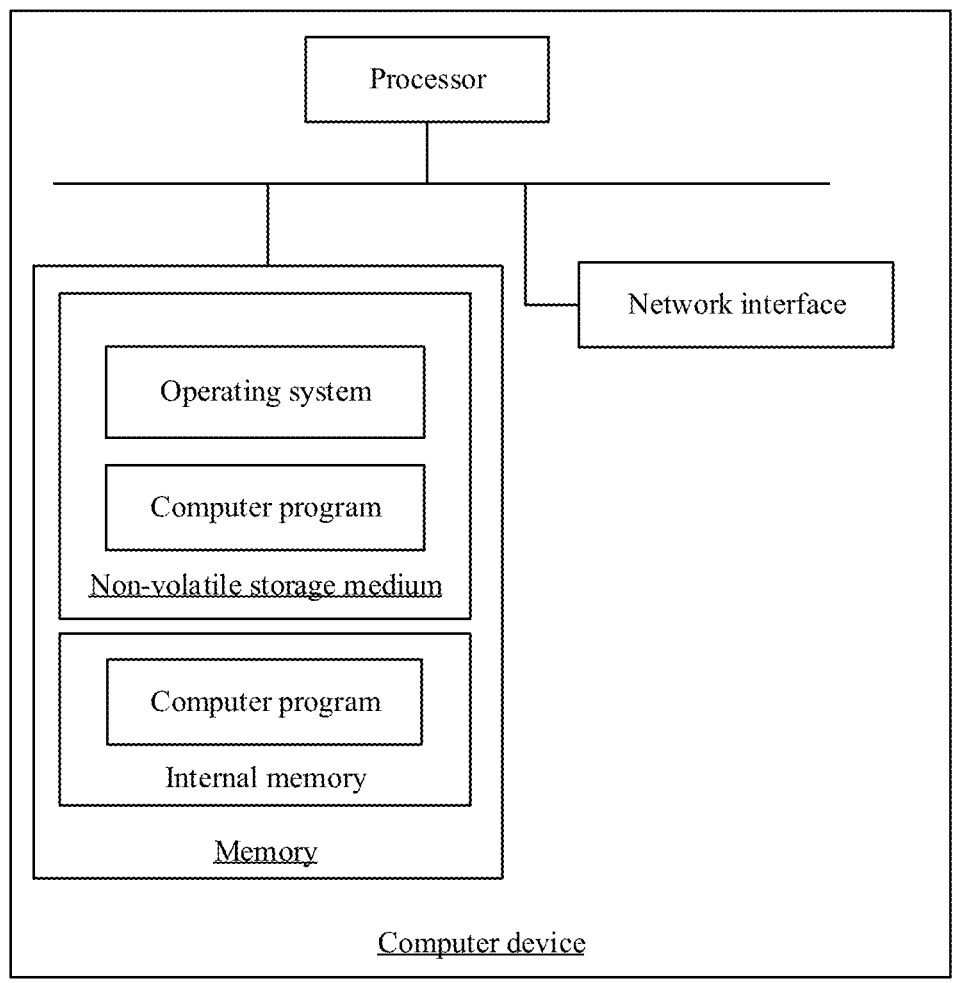
FIG. 10 is a structural block diagram of a computer device according to an embodiment.

FIG. 10 is a diagram showing an internal structure of a computer device in an embodiment. The computer device may be specifically the video distribution server 120 in FIG. 1. As shown in FIG. 10, the computer device includes a processor, a memory, and a network interface that are connected through a system bus. The memory includes a non-volatile storage medium and an internal memory. The non-volatile storage medium of the computer device stores an operating system and may further store a computer program, the computer program, when executed by the processor, causing the processor to implement the video encoding method. The internal memory may also store a computer program. When executed by the processor, the computer program may cause the processor to perform the video encoding method.

A person skilled in the art would understand that the structure shown in FIG. 10 is only a block diagram of a partial structure related to the solution of the disclosure, and does not constitute a limitation on the computer device to which the solution of the disclosure is applied. The computer device may include more or fewer components than those shown in the figure, or some components may be combined, or a different component arrangement may be used.

In an embodiment, the video encoding apparatus 900 provided in the disclosure may be implemented in a form of a computer program. The computer program may run on the computer device shown in FIG. 10. The memory of the computer device may store various program modules that form the video encoding apparatus 900, for example, the video frame acquisition module 902, the historical complexity calculation module 904, the available bit rate acquisition module 906, the bit rate adjusting module 908, the quantization parameter updating module 910, and the encoding module 912 that are shown in FIG. 9. The computer program formed by the program modules causes the processor to perform the operations of the video encoding method described in the embodiments of the disclosure in this specification.

For example, the computer device shown in FIG. 10 may perform operation S202 by using the video frame acquisition module 902 in the video encoding apparatus 900 shown in FIG. 9. The computer device may perform operation S204 by using the historical complexity calculation module 904. The computer device may perform operation S206 by using the available bit rate acquisition module 906. The computer device may perform operation S208 by using the adjusting module 908. The computer device may perform operation S210 by using the quantization parameter updating module 910. The computer device may perform operation S212 by using the encoding module 912.

In an embodiment, a computer device is provided, including a memory and a processor, the memory storing a computer program, the computer program, when executed by the processor, causing the processor to perform the following operations:

acquiring a current video frame to be encoded and an initial quantization parameter;

calculating first historical complexity corresponding to the current video frame at a first time granularity;

acquiring a current second available bit rate at a second time granularity and a current first available bit rate at the first time granularity, the second time granularity being a finer time unit relative to the first time granularity;

adjusting a bit rate between the second available bit rate and the first available bit rate based on the second available bit rate and the first available bit rate according to complexity of the current video frame and the first historical complexity;

updating the initial quantization parameter according to an adjusted second available bit rate to obtain a current quantization parameter; and encoding the current video frame according to the current quantization parameter.

In an embodiment, the computer program, when executed by the processor, causes the processor to perform the following operations:

determining a first historical video frame sequence corresponding to the current video frame;

acquiring complexity of each video frame in the first historical video frame sequence; and calculating the first historical complexity corresponding to the current video frame according to the complexity of the each video frame.

In an embodiment, the computer program, when executed by the processor, causes the processor to perform the following operations:

calculating first historical average complexity according to the complexity of the each video frame;

calculating a first historical complexity fluctuation degree according to the complexity of the each video frame; and fusing the first historical average complexity and the first historical complexity fluctuation degree to obtain the first historical complexity.

In an embodiment, the first historical complexity corresponding to the current video frame is obtained through calculation using the following formulas:

$$Pcplx_i = satdavg_i + w * (satdvar_i - satdavg_i);$$

$$satdavg_i = \frac{\sum_{j=1}^{N} satd_j}{N};$$

$$satdvar_i = \frac{\sum_{j=1}^{N} satd_j^2}{\sum_{j=1}^{N} satd_j};$$

where $Pcplx_i$ represents first historical complexity corresponding to a current video frame i; $satdavg_i$ represents first historical average complexity obtained through calculation according to N video frames before the current video frame i; $satd\,var_i$ represents a first historical complexity fluctuation obtained through calculation according to the N video frames before the current video frame i; $satdavg_i - satd\,var_i$ represents a first historical complexity fluctuation degree; $satd_j$ represents complexity of a $j^{th}$ video frame before the current video frame i; and w represents a preset weight coefficient of fluctuation degree.

In an embodiment, the computer program, when executed by the processor, causes the processor to perform the following operations:

acquiring complexity of the current video frame;

determining a magnitude relationship between the complexity of the current video frame and the first historical complexity;

subtracting a first bit rate from the first available bit rate and adding the first bit rate to the second available bit rate in a case that the complexity of the current video frame is higher than the first historical complexity; and subtracting a second bit rate from the second available bit rate and adding the second bit rate to the first available bit rate in a case that the complexity of the current video frame is lower than the first historical complexity.

In an embodiment, the first bit rate is positively correlated with the first available bit rate; and the first bit rate is positively correlated with the difference between the complexity of the current video frame and the first historical complexity.

In an embodiment, the second bit rate is positively correlated with the current second available bit rate; the second bit rate is positively correlated with a degree of fullness of the second available bit rate; and the second bit rate is positively correlated with the difference between the complexity of the current video frame and the first historical complexity.

In an embodiment, the computer program, when executed by the processor, causes the processor to perform the following operations:

adjusting, in a case that the second available bit rate added with the first bit rate exceeds a maximum value corresponding to the second available bit rate, the second available bit rate to be the maximum value corresponding to the second available bit rate; and/or adjusting, in a case that the first available bit rate added with the second bit rate exceeds a maximum value corresponding to the first available bit rate, the first available bit rate to be the maximum value corresponding to the first available bit rate.

In an embodiment, the first bit rate and the second bit rate are obtained through calculation using the following formulas:

$$Adm\_Bits = Min(\alpha * AdRation * m\_buffer, s\_buffer_{max} - s\_buffer);$$

$$Ads\_Bits = Min\left(\alpha * |AdRation| * s\_buffer * \frac{s\_buffer}{s\_buffer_{max}}, m\_buffer_{max} - m\_buffer\right);$$

where Adm_Bits represents the first bit rate to be subtracted from the first available bit rate; Ads_Bits represents the second bit rate to be subtracted from the second available bit rate; AdRation represents a difference between the complexity of the current video frame and the first historical complexity; m_buffer represents the current first available bit rate; s_buffer represents the current second available bit rate; $m\_buffer_{max}$ represents the maximum value corresponding to the first available bit rate; $s\_buffer_{max}$ represents the maximum value corresponding to the second available bit rate;

$$\frac{s\_buffer}{s\_buffer_{max}}$$

represents the degree of fullness of the second available bit rate; $\alpha$ represents a preset equalization adjustment parameter; and Min represents a function for taking a minimum value.

In an embodiment, the computer program, when executed by the processor, causes the processor to perform the following operations:

acquiring a video frame sequence that is in a second time granularity detection window and that corresponds to the current video frame; and gradually increasing a value starting from the initial quantization parameter until the current quantization parameter is obtained, so that a cumulative encoding bit rate, estimated based on the video frame sequence and the current quantization parameter, and the adjusted second available bit rate conform to a preset bit rate relationship.

In an embodiment, the computer program, when executed by the processor, causes the processor to perform the following operations:

obtaining a result of a quantization operation corresponding to the current video frame according to the current quantization parameter; and encoding the current video frame according to the result of the quantization operation to obtain an actually occupied bit rate corresponding to the current video frame In an embodiment, the computer program, when executed by the processor, causes the processor to perform the following operations:

acquiring a target bit rate corresponding to a target video frame sequence to which the current video frame belongs;

calculating an average allocable bit rate per frame according to the target bit rate and a frame rate of the target video frame sequence;

acquiring an actually occupied bit rate corresponding to the current video frame that has been encoded; and updating the adjusted second available bit rate according to the average allocable bit rate per frame and the actually occupied bit rate to obtain a second available bit rate corresponding to a next video frame.

In an embodiment, a non-transitory computer-readable storage medium is provided, storing a computer program, the computer program, when executed by a processor, causing the processor to perform the following operations:

acquiring a current video frame to be encoded and an initial quantization parameter;

calculating first historical complexity corresponding to the current video frame at a first time granularity;

acquiring a current second available bit rate at a second time granularity and a current first available bit rate at the first time granularity, the second time granularity being a finer time unit relative to the first time granularity;

adjusting a bit rate between the second available bit rate and the first available bit rate based on the second available bit rate and the first available bit rate according to complexity of the current video frame and the first historical complexity;

updating the initial quantization parameter according to an adjusted second available bit rate to obtain a current quantization parameter; and encoding the current video frame according to the current quantization parameter.

In an embodiment, the computer program, when executed by the processor, causes the processor to perform the following operations:

determining a first historical video frame sequence corresponding to the current video frame;

acquiring complexity of each video frame in the first historical video frame sequence; and calculating the first historical complexity corresponding to the current video frame according to the complexity of the each video frame.

In an embodiment, the computer program, when executed by the processor, causes the processor to perform the following operations:

calculating first historical average complexity according to the complexity of the each video frame;

calculating a first historical complexity fluctuation degree according to the complexity of the each video frame; and fusing the first historical average complexity and the first historical complexity fluctuation degree to obtain the first historical complexity.

In an embodiment, the first historical complexity corresponding to the current video frame is obtained through calculation using the following formulas:

$$Pcplx_i = satdavg_i + w*(satdvar_i - satdavg_i);$$

$$satdavg_i = \frac{\sum_{j=1}^{N} satd_j}{N};$$

$$satdvar_i = \frac{\sum_{j=1}^{N} satd_j^2}{\sum_{j=1}^{N} satd_j};$$

where $Pcplx_i$ represents first historical complexity corresponding to a current video frame i; $satdavg_i$ represents first historical average complexity obtained through calculation according to N video frames before the current video frame i; $satdvar_i$ represents a first historical complexity fluctuation obtained through calculation according to the N video frames before the current video frame i; $satdavg_i - satdvar_i$ represents a first historical complexity fluctuation degree; $satd_j$ represents complexity of a $j^{th}$ video frame before the current video frame i; and w represents a preset weight coefficient of fluctuation degree.

In an embodiment, the computer program, when executed by the processor, causes the processor to perform the following operations:

acquiring complexity of the current video frame;

determining a magnitude relationship between the complexity of the current video frame and the first historical complexity;

subtracting a first bit rate from the first available bit rate and adding the first bit rate to the second available bit rate in a case that the complexity of the current video frame is higher than the first historical complexity; and subtracting a second bit rate from the second available bit rate and adding the second bit rate to the first available bit rate in a case that the complexity of the current video frame is lower than the first historical complexity.

In an embodiment, the first bit rate is positively correlated with the first available bit rate; and the first bit rate is positively correlated with the difference between the complexity of the current video frame and the first historical complexity.

In an embodiment, the second bit rate is positively correlated with the current second available bit rate; the second bit rate is positively correlated with a degree of fullness of the second available bit rate; and the second bit rate is positively correlated with the difference between the complexity of the current video frame and the first historical complexity.

In an embodiment, the computer program, when executed by the processor, causes the processor to perform the following operations:

adjusting, in a case that the second available bit rate added with the first bit rate exceeds a maximum value corresponding to the second available bit rate, the second available bit rate to be the maximum value corresponding to the second available bit rate; and/or adjusting, in a case that the first available bit rate added with the second bit rate exceeds a maximum value corresponding to the first available bit rate, the first available bit rate to be the maximum value corresponding to the first available bit rate.

In an embodiment, the first bit rate and the second bit rate are obtained through calculation using the following formulas:

$$\text{Adm\_Bits} = \text{Min}(\alpha * AdRation * \text{m\_buffer}, \text{s\_buffer}_{max} - \text{s\_buffer});$$

$$\text{Ads\_Bits} = \text{Min}\left(\alpha * |AdRation| * \text{s\_buffer} * \frac{\text{s\_buffer}}{\text{s\_buffer}_{max}}, \text{m\_buffer}_{max} - \text{m\_buffer}\right);$$

where Adm_Bits represents the first bit rate to be subtracted from the first available bit rate; Ads_Bits represents the second bit rate to be subtracted from the second available bit rate; AdRation represents a difference between the complexity of the current video frame and the first historical complexity; m_buffer represents the current first available bit rate; s_buffer represents the current second available bit rate; $\text{m\_buffer}_{max}$ represents the maximum value corresponding to the first available bit rate; $\text{s\_buffer}_{max}$ represents the maximum value corresponding to the second available bit rate;

$$\frac{\text{s\_buffer}}{\text{s\_buffer}_{max}}$$

represents the degree of fullness of the second available bit rate; α represents a preset equalization adjustment parameter; and Min represents a function for taking a minimum value.

In an embodiment, the computer program, when executed by the processor, causes the processor to perform the following operations:

acquiring a video frame sequence that is in a second time granularity detection window and that corresponds to the current video frame; and gradually increasing a value starting from the initial quantization parameter until the current quantization parameter is obtained, so that a cumulative encoding bit rate, estimated based on the video frame sequence and the current quantization parameter, and the adjusted second available bit rate conform to a preset bit rate relationship.

In an embodiment, the computer program, when executed by the processor, causes the processor to perform the following operations:

obtaining a result of a current quantization operation corresponding to the current video frame according to the current quantization parameter; and encoding the current video frame according to the result of the current quantization operation to obtain an actually occupied bit rate corresponding to the current video frame.

In an embodiment, the computer program, when executed by the processor, causes the processor to perform the following operations:

acquiring a target bit rate corresponding to a target video frame sequence to which the current video frame belongs;

calculating an average allocable bit rate per frame according to the target bit rate and a frame rate of the target video frame sequence;

acquiring an actually occupied bit rate corresponding to the current video frame that has been encoded; and updating the adjusted second available bit rate according to the average allocable bit rate per frame and the actually occupied bit rate to obtain a second available bit rate corresponding to a next video frame.

A person of ordinary skill in the art would understand that all or some of the processes of the methods in the foregoing embodiments may be implemented by a computer program instructing relevant hardware. The program may be stored in a non-volatile computer-readable storage medium. When the program runs, the procedures of the foregoing method embodiments may be included. Any reference to a memory, storage, database or another medium used in the embodiments provided in the disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a rambus direct RAM (RDRAM), a direct rambus dynamic RAM (DRDRAM), and a rambus dynamic RAM (DRAM).

The technical features in the foregoing embodiments may be randomly combined. For concise description, not all possible combinations of the technical features in the embodiment are described. However, the combinations of the technical features are to be considered as falling within the scope recorded in this specification provided that they do not conflict with each other.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like. Software components, elements, modules or units, or code, may be implemented or written using a computer programming language.

Through the foregoing video encoding method and apparatus, the non-transitory computer-readable storage medium, and the computer device, the first available bit rate may represent status of an available bit rate at the first time granularity, the second available bit rate may indicate status of an available bit rate at the second time granularity, and the second time granularity is a finer time unit relative to the first time granularity. A combination of the first bit rate and the second available bit rate may achieve bit rate control at the first time granularity and further achieve bit rate allocation in a larger time range, rendering the bit rate allocation more uniform and significantly improving encoding quality. During encoding, the first historical complexity corresponding to the current video frame is acquired. Based on the above, encoding complexity of the current video frame at the first time granularity is predicted according to the complexity of the current video frame, the current second available bit rate, and the current first available bit rate, so as to adjust the second available bit rate. The current quantization parameter corresponding to the current video frame then may be determined according to the adjusted second available bit rate. Finally, the current video frame is encoded according to the current quantization parameter.

Only several implementations of the disclosure are described in the foregoing embodiments, and are described in detail, but they are not to be construed as a limitation to the patent scope of the disclosure. A person of ordinary skill in the art may further make variations and improvements without departing from the ideas of the disclosure, which shall fall within the protection scope of the disclosure. Therefore, the protection scope of the disclosure shall be subject to the protection scope of the appended claims.

What is claimed is:

1. A video encoding method, performed by a computer device, the method comprising:
    acquiring a current video frame and an initial quantization parameter;
    calculating, based on complexity corresponding to a plurality of video frames before, and exclusive of, the current video frame, first historical complexity corresponding to the current video frame at a first time granularity;
    acquiring a second available bit rate at a second time granularity corresponding to the current video frame and a first available bit rate at the first time granularity corresponding to the current video frame, the second time granularity being a finer time unit relative to the first time granularity;
    determining a difference between complexity of the current video frame and the first historical complexity;
    adjusting the second available bit rate and the first available bit rate according to the complexity of the current video frame and the first historical complexity, the adjusting comprises increasing the second available bit rate based on the complexity of the current video frame being higher than the first historical complexity or decreasing the second available bit rate based on the complexity of the current video frame being higher than the first historical complexity;
    updating the initial quantization parameter according to the adjusted second available bit rate to obtain a current quantization parameter; and
    encoding the current video frame according to the current quantization parameter.

2. The method according to claim 1, wherein the calculating comprises:
    determining a first historical video frame sequence corresponding to the current video frame;
    acquiring complexity of each video frame in the first historical video frame sequence; and
    calculating the first historical complexity corresponding to the current video frame according to the complexity of each video frame.

3. The method according to claim 2, wherein the calculating the first historical complexity corresponding to the current video frame according to the complexity of each video frame comprises:
    calculating first historical average complexity according to the complexity of each video frame;
    calculating a first historical complexity fluctuation degree according to the complexity of each video frame; and
    fusing the first historical average complexity and the first historical complexity fluctuation degree to obtain the first historical complexity.

4. The method according to claim 3, wherein the first historical complexity corresponding to the current video frame is obtained through calculation using the following formulas:

$$Pcplx_i = satdavg_i + w*(satdvar_i - satdavg_i);$$

$$satdavg_i = \frac{\sum_{j=1}^{N} satd_j}{N};$$

$$satdvar_i = \frac{\sum_{j=1}^{N} satd_j^2}{\sum_{j=1}^{N} satd_j};$$

wherein $Pcplx_i$ represents first historical complexity corresponding to a current video frame i; $satdavg_i$ represents first historical average complexity obtained through calculation according to N video frames before the current video frame i; $satd\ var_i$ represents a first historical complexity fluctuation obtained through calculation according to the N video frames before the current video frame i; $satdavg_i - satd\ var_i$ represents the first historical complexity fluctuation degree; $satd_j$ represents complexity of a $j^{th}$ video frame before the current video frame i; and w represents a preset weight coefficient of the first historical complexity fluctuation degree.

5. The method according to claim 1, wherein the adjusting further comprises:
    subtracting a first bit rate from the first available bit rate and adding the first bit rate to the second available bit rate based on the complexity of the current video frame being higher than the first historical complexity; or subtracting a second bit rate from the second available bit rate and adding the second bit rate to the first available bit rate based on the complexity of the current video frame being lower than the first historical complexity.

6. The method according to claim 5, wherein the first bit rate is positively correlated with the first available bit rate, and
    wherein the first bit rate is positively correlated with the difference between the complexity of the current video frame and the first historical complexity.

7. The method according to claim 5, wherein the second bit rate is positively correlated with the second available bit rate, wherein the second bit rate is positively correlated with a degree of fullness of the second available bit rate; and wherein the second bit rate is positively correlated with the difference between the complexity of the current video frame and the first historical complexity.

8. The method according to claim 5, further comprising:

adjusting, based on the second available bit rate added with the first bit rate exceeding a maximum value corresponding to the second available bit rate, the second available bit rate to be the maximum value corresponding to the second available bit rate; and/or adjusting, based on the first available bit rate added with the second bit rate exceeding a maximum value corresponding to the first available bit rate, the first available bit rate to be the maximum value corresponding to the first available bit rate.

9. The method according to claim 5, wherein the first bit rate and the second bit rate are obtained through calculation using the following formulas:

$$\text{Adm\_Bits} = \text{Min}(\alpha * AdRation * \text{m\_buffer}, \text{s\_buffer}_{max} - \text{s\_buffer});$$

$$\text{Ads\_Bits} = \text{Min}\left(\alpha * |AdRation| * \text{s\_buffer} * \frac{\text{s\_buffer}}{\text{s\_buffer}_{max}}, \text{m\_buffer}_{max} - \text{m\_buffer}\right);$$

wherein Adm_Bits represents the first bit rate to be subtracted from the first available bit rate; Ads_Bits represents the second bit rate to be subtracted from the second available bit rate; AdRation represents the difference between the complexity of the current video frame and the first historical complexity; m_buffer represents the first available bit rate corresponding to the current video frame; s_buffer represents the second available bit rate corresponding to the current video frame; $\text{m\_buffer}_{max}$ represents a maximum value corresponding to the first available bit rate; $\text{s\_buffer}_{max}$ represents a maximum value corresponding to the second available bit rate;

$$\frac{\text{s\_buffer}}{\text{s\_buffer}_{max}}$$

represents a degree of fullness of the second available bit rate; α represents a preset equalization adjustment parameter; and Min represents a function of taking a minimum value.

10. The method according to claim 1, wherein the updating comprises:

acquiring a video frame sequence that is in a second time granularity detection window and that corresponds to the current video frame; and gradually increasing a value of the initial quantization parameter until the current quantization parameter is reached, wherein a cumulative encoding bit rate, estimated based on the video frame sequence and the current quantization parameter, and the adjusted second available bit rate conform to a preset bit rate relationship.

11. The method according to claim 1, wherein the encoding comprises:

encoding the current video frame by performing a quantization operation on the current video frame according to the current quantization parameter, to obtain an actually occupied bit rate corresponding to the current video frame.

12. The method according to claim 1, further comprising:

acquiring a target bit rate corresponding to a target video frame sequence to which the current video frame belongs;

calculating an average allocable bit rate per frame according to the target bit rate and a frame rate of the target video frame sequence;

acquiring an actually occupied bit rate corresponding to the current video frame that has been encoded; and updating the adjusted second available bit rate according to the average allocable bit rate per frame and the actually occupied bit rate to obtain a second available bit rate corresponding to a next video frame.

13. A video encoding apparatus, comprising:

at least one memory configured to store program code; and at least one processor configured to read the program code and operate as instructed by the program code, the program code comprising:

video frame acquisition code configured to cause at least one of the at least one processor to acquire a current video frame and an initial quantization parameter;

historical complexity calculation code configured to cause at least one of the at least one processor to calculate, based on complexity corresponding to a plurality of video frames before, and exclusive of, the current video frame, first historical complexity corresponding to the current video frame at a first time granularity;

available bit rate acquisition code configured to cause at least one of the at least one processor to acquire a second available bit rate at a second time granularity corresponding to the current video frame and a first available bit rate at the first time granularity corresponding to the current video frame, the second time granularity being a finer time unit relative to the first time granularity;

complexity difference determination code configured to cause at least one of the at least one processor to determine a difference between complexity of the current video frame and the first historical complexity;

bit rate adjusting code configured to cause at least one of the at least one processor to adjust the second available bit rate and the first available bit rate according to the complexity of the current video frame and the first historical complexity, the adjusting comprises increasing the second available bit rate based on the complexity of the current video frame being higher than the first historical complexity or decreasing the second available bit rate based on the complexity of the current video frame being higher than the first historical complexity;

quantization parameter updating code configured to cause at least one of the at least one processor to update the initial quantization parameter according to the adjusted second available bit rate to obtain a current quantization parameter; and encoding code configured to cause at least one of the at least one processor to encode the current video frame according to the current quantization parameter.

14. The apparatus according to claim 13, wherein the historical complexity calculation code comprises:

determination code configured to cause at least one of the at least one processor to determine a first historical video frame sequence corresponding to the current video frame;

complexity acquisition code configured to cause at least one of the at least one processor to acquire complexity of each video frame in the first historical video frame sequence; and first historical complexity calculation code configured to cause at least one of the at least one processor to calculate the first historical complexity corresponding to the current video frame according to the complexity of each video frame.

15. The apparatus according to claim 14, wherein the first historical complexity calculation code is configured to cause at least one of the at least one processor to calculate first historical average complexity according to the complexity of each video frame, calculate a first historical complexity fluctuation degree according to the complexity of each video frame, and fuse the first historical average complexity and the first historical complexity fluctuation degree to obtain the first historical complexity.

16. The apparatus according to claim 13, wherein the bit rate adjusting code is configured to cause at least one of the at least one processor to:
subtract a first bit rate from the first available bit rate and adding the first bit rate to the second available bit rate based on the complexity of the current video frame being higher than the first historical complexity, or subtract a second bit rate from the second available bit rate and adding the second bit rate to the first available bit rate based on the complexity of the current video frame being lower than the first historical complexity.

17. The apparatus according to claim 13, wherein the quantization parameter updating code comprises:
video frame sequence acquisition code configured to cause at least one of the at least one processor to acquire a video frame sequence that is in a second time granularity detection window and that corresponds to the current video frame; and current quantization parameter acquisition code configured to cause at least one of the at least one processor to gradually increase a value of the initial quantization parameter until the current quantization parameter is reached, wherein a cumulative encoding bit rate, estimated based on the video frame sequence and the current quantization parameter, and the adjusted second available bit rate conform to a preset bit rate relationship.

18. The apparatus according to claim 13, wherein the encoding code is configured to cause at least one of the at least one processor to encode the current video frame by performing a quantization operation on the current video frame according to the current quantization parameter, to obtain an actually occupied bit rate corresponding to the current video frame.

19. The apparatus according to claim 13, wherein the program code further comprises:
target bit rate acquisition code configured to cause at least one of the at least one processor to acquire a target bit rate corresponding to a target video frame sequence to which the current video frame belongs;

average allocable bit rate calculation code configured to cause at least one of the at least one processor to calculate an average allocable bit rate per frame according to the target bit rate and a frame rate of the target video frame sequence;

bit rate acquisition code configured to cause at least one of the at least one processor to acquire an actually occupied bit rate corresponding to the current video frame that has been encoded; and updating code configured to cause at least one of the at least one processor to update the adjusted second available bit rate according to the average allocable bit rate per frame and the actually occupied bit rate to obtain a second available bit rate corresponding to a next video frame.

20. A non-transitory computer-readable storage medium, storing a computer program, the computer program, when executed by a processor, causing the processor to perform:
acquiring a current video frame and an initial quantization parameter;

calculating, based on complexity corresponding to a plurality of video frames before, and exclusive of, the current video frame, first historical complexity corresponding to the current video frame at a first time granularity;

acquiring a second available bit rate at a second time granularity corresponding to the current video frame and a first available bit rate at the first time granularity corresponding to the current video frame, the second time granularity being a finer time unit relative to the first time granularity;

determining a difference between complexity of the current video frame and the first historical complexity;

adjusting the second available bit rate and the first available bit rate according to the complexity of the current video frame and the first historical complexity, the adjusting comprises increasing the second available bit rate based on the complexity of the current video frame being higher than the first historical complexity or decreasing the second available bit rate based on the complexity of the current video frame being higher than the first historical complexity;

updating the initial quantization parameter according to the adjusted second available bit rate to obtain a current quantization parameter; and encoding the current video frame according to the current quantization parameter.

* * * * *